United States Patent [19]
Beckley

[11] Patent Number: 5,783,802
[45] Date of Patent: Jul. 21, 1998

[54] VERTICALLY LIFTED PORTABLE ELECTRIC FURNACE AND METHOD FOR USE THEREOF

[76] Inventor: John P. Beckley, 1609 S. Springwood Dr., Silver Spring, Md. 20910

[21] Appl. No.: 709,447

[22] Filed: Sep. 6, 1996

Related U.S. Application Data

[63] Continuation of Ser. No. 459,132, Jun. 2, 1995, Pat. No. 5,585,023, which is a continuation of Ser. No. 267,401, Jun. 29, 1994, Pat. No. 5,539,183.

[51] Int. Cl.⁶ .................................................. F27D 11/00
[52] U.S. Cl. ........................... 219/386; 219/385; 219/390; 373/119
[58] Field of Search .................................. 219/385, 386, 219/390, 400, 406, 408; 373/110–122, 126, 128–131, 134, 137

[56] References Cited

U.S. PATENT DOCUMENTS

| | | | |
|---|---|---|---|
| 538,271 | 4/1895 | O'Neill | 219/246 |
| 3,227,798 | 1/1966 | Delange et al. | 219/390 |
| 3,752,643 | 8/1973 | Robinson | 432/120 |
| 3,786,162 | 1/1974 | Colson | 373/11 |
| 4,692,593 | 9/1987 | Chiu | 219/362 |
| 5,539,183 | 7/1996 | Beckley | 219/386 |

*Primary Examiner*—Tu B. Hoang
*Attorney, Agent, or Firm*—Antonelli, Terry, Stout, & Kraus, LLP

[57] ABSTRACT

A method and apparatus for heating a metallic material held by a holder such as a crucible which is positioned on a base using an electric furnace. The electric furnace includes a sleeve, an electric heating element disposed on the inner surface of the sleeve, a removable lid for covering a top opening of the sleeve and at least one handle disposed on the outer surface of the sleeve for lifting and removing the sleeve from the base or placing the sleeve on the base. When the sleeve is placed on the base enclosing the crucible, the removable lid is placed on the top opening of the sleeve and an electric current is applied to the electric heating element. Heat generated by the electric heating element and retained in the furnace melts the material contained in the crucible.

20 Claims, 5 Drawing Sheets

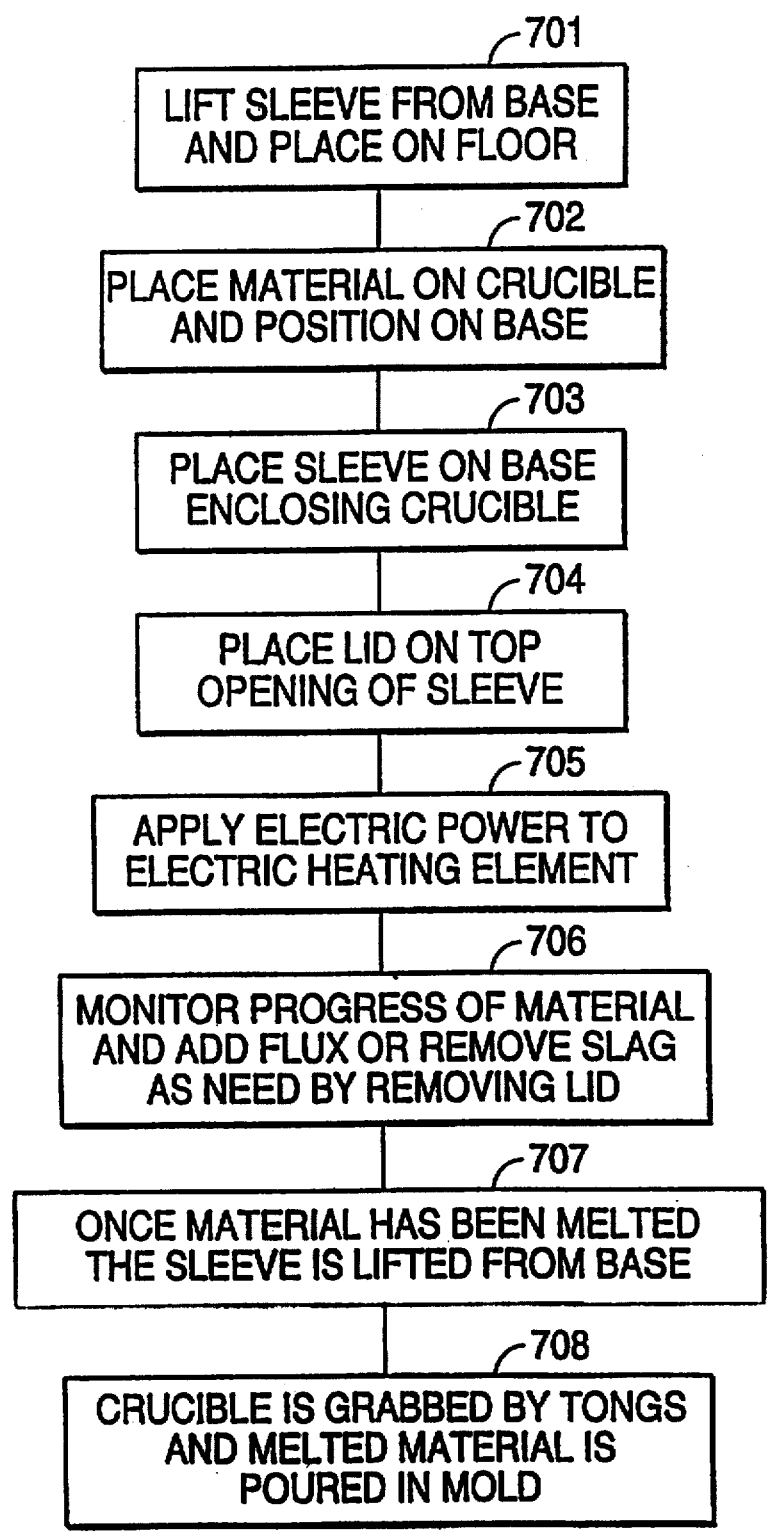

VERTICALLY LIFTED PORTABLE ELECTRIC FURNACE AND METHOD FOR USE THEREOF

This is a continuation of application Ser. No. 08/459,132, filed Jun. 2, 1995, now U.S. Pat. No. 5,585,023; which is a continuation of application Ser. No. 08/267,401, filed Jun. 29, 1994, now U.S. Pat. No. 5,539,183.

BACKGROUND OF THE INVENTION

The present invention relates to a furnace, for heating and ultimately melting a material at high temperatures. More particularly, the present invention relates to an easy to use and portable electric furnace having handles to permit the furnace to be vertically lifted and moved about. The furnace is lifted from the base once the metallic material has been melted thereby reducing unnecessary handling of the melted metallic material. The molten metal is only handled once.

Small metal castings, such as those made by hobbyist, artist or professionals using, for example, five pounds or more of material, heretofore have been difficult or expensive to make. Further, extreme safety risks are created in the handling of the melted material, particularly when casting materials having high melting temperatures such as bronze. Bronze has a melting point of 2000° fahrenheit.

Currently in order for hobbyist, artist or professionals to cast a metal object the object must be relatively small using small amounts of material and/or made of a material having a low melting point such as gold. Satisfying such constraints permits the use of small heaters such as those used by jewelers, small part makers, etc.

Small heaters used by jewelers satisfy the requirement of portability being that they can be moved and used in almost any setting and require standard household electricity to operate. However, such heaters suffer from various disadvantages. Namely the heaters can only melt small quantities of metallic material. Further, the heaters cannot be used to melt, for example, a pound or more of material used to cast works of art, machine parts or tools. In order for the hobbyist, artist or even a professional to cast small metal objects using approximately a pound or more of material larger furnaces, such as those owned by foundries, are used. Foundries typically use fuel fired furnaces. A fuel fired furnace 210 as illustrated in FIG. 2A has a cylindrical opening 212 for receiving a crucible 214 containing the material to be melted. The fuel fired furnace 210 also includes gas jets 216 that when lit applies a flame to the inside of the opening 212. The heat generated by the flame causes the metallic material contained in the crucible 214 to reach its melting point.

The above-described fuel fired furnace 210 suffers from various disadvantages. One disadvantage is that the fuel fired furnace 210 is not portable and can only be operated by professionals. Another most important disadvantage is that the melted material must be handled at least two times prior to casting.

Due to the construction of the fuel fired furnace 210 the crucible containing the metallic material must be vertically lowered into and lifted out of the opening 212 of the furnace by lifting tongs 218 as illustrated in FIG. 2B. The lifting tongs 218 are manipulated by two operators, one at either end of the lifting tongs 218. The two operators by manipulating the lifting tongs 218 causes the fingers 220 of the lifting tongs 218 to clamp about the crucible 214. The crucible 214 is then lifted out of the opening 212 of the furnace 210 in the vertical direction. Once the crucible 214 containing the melted material has been lifted out of the opening 212 of the furnace 210, the crucible 214 is then placed on the floor of the foundry within a pouring ring 222 of pouring tongs 224 as illustrated in FIGS. 2C and 2D. The pouring tongs 224 have a pouring finger 226 which clamps over the lip of the crucible 214 to prevent the crucible 214 from slipping out of the pouring ring 222 during pouring. Two operators are also necessary for manipulating the pouring tongs 224. One of the operators acts as a fulcrum while the other operator acts as the controller. The controller tilts the crucible 214 to control the pouring of the melted material by use of the handlebars 226.

Thus, the crucible containing the melted material is handled a first time when the crucible is lifted from the opening of the furnace and placed on the floor of the foundry using lifting tongs and a second time when the crucible is lifted from the floor of the foundry and the melted material is poured into the mold using the pouring tongs. Handling a melted material at temperatures sometimes as high as 2000° fahrenheit can be extremely dangerous for the professional as well as the non-professional such as hobbyist and artist. Injury to the operator or damage to the surrounding area may occur.

Therefore, for professionals and particularly non-professionals there is a need to provide a furnace that is portable and easy to use and that reduces the number of times the melted material is handled.

SUMMARY OF THE INVENTION

An object of the present invention is to provide an electric furnace for heating and melting materials at high temperatures that is portable and easy to use.

Another object of the present invention is to provide an electric furnace for heating and melting approximately five pounds or more of material at a high temperature within a reasonable time to cast small and medium sized objects.

Yet another further object of the present invention is to provide an electric furnace for heating and melting a material at high temperatures that reduces unnecessary handling of the heated or melted material.

The present invention provides a portable and easy to use electric furnace for heating and melting a metallic material held by a holder such as a crucible which is positioned on a base. The electric furnace of the present invention includes a sleeve, that may be cylindrical in shape and has a hollow opening that extends its entire length.

The electric furnace of the present invention also includes an electric heating element disposed within the inner surface of the sleeve, a removable lid for covering a top opening of the sleeve and at least one handle disposed on the outer surface of the sleeve. The handle permits the sleeve to be vertically lifted by a user to remove the sleeve from or place the sleeve on the base. The handle is also used to move the furnace from one location to the next. The removable lid allows the user to monitor the status of the material being heated, add more material as needed and perform operations to aid in the melting process such as add flux or remove slag. The removable lid also allows the user to view the holder during lifting of the sleeve. The furnace is relative small in structure permitting the furnace to be set up in a small area and the furnace operates using standard household current.

The electric furnace is operated by placing the sleeve on the base with the hollow opening of the sleeve being positioned around the crucible. The removable lid is placed on the top opening of the sleeve. The removable lid, the inner surface of the sleeve and the base forms a heating chamber for heating the material contained in the crucible. The material contained in the crucible is heated and ultimately melted when standard household electric current is applied to the electric heating element.

The removable lid may be pivotally mounted on the top surface of the sleeve. Also the sleeve may be formed as a heating unit with an open bottom, a closed top and an opening formed with the heating unit communication with the open bottom. Thus, the need for a lid is eliminated and a window may be provided at the closed top to permit the user to monitor the status of the material being melted.

BRIEF DESCRIPTION OF THE DRAWINGS

The improvements of the present invention and the advantages resulting therefrom will become apparent upon reading the following description of the preferred embodiments in light of the drawings in which like parts are designated with like numerals and in which:

FIG. 7 is a flowchart of the steps of heating a metallic material using the electric furnace of the present invention.

DESCRIPTION OF THE PREFERRED EMBODIMENTS

The present invention provides an electric furnace for heating and melting a metallic material held by a hold such as a crucible which is positioned on a base. The electric furnace of the present invention is easy to use, portable and reduces unnecessary handling of the molten or heated material by the user. The electric furnace of the present invention accomplishes this by providing handles on the outer surface of the furnace and an opening in the bottom surface of the furnace permitting the user to vertically lift the electric furnace up and away from the base thereby exposing the crucible. The user can then grab the crucible using tongs and pour the melted material into a mold. Thus, the electric furnace of the present invention only requires the user to handle the melted material when the melted material is ready to be poured into the mold. Further, the electric furnace of the present invention can be easily moved from one location to the next using the handles and can be set up and operated in a small area due to its relatively small structure. Also the electric furnace of the present invention can be operated using standard household electric current.

Figure 1A:
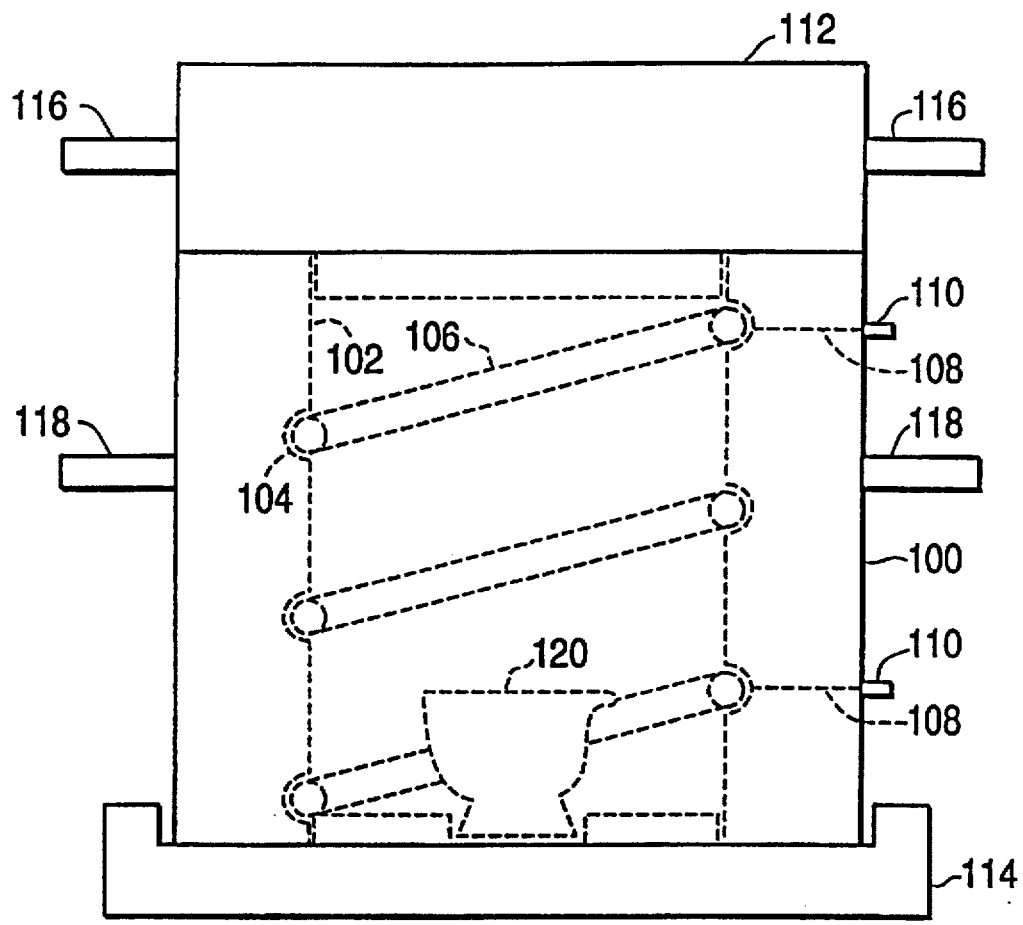
FIG. 1A illustrates an electric furnace of the present invention.

The electric furnace of the present invention, as illustrated in FIG. 1A, includes a sleeve 100 having inner and outer surfaces and a hollow opening 102 formed by the inner surface that extends the entire length of the sleeve 100. The sleeve 100 has a continuous helical groove 104 formed in the inner surface of the sleeve 100. The helical groove 104 has an electric heating element 106 disposed therein. The electric heating element 106 is connected to conductors 108 which are connected to connectors 110 attached to the outer surface of the sleeve 100. The connectors 110 permit ground and voltage potentials to be applied to the electric heating element 106. Applying ground and voltage potentials to connectors 110 causes an electric current to flow through the electric heating element 106 thereby generating heat.

The electric furnace of the present invention also includes a removable lid 112 and a base 114 for covering top and bottom openings of the sleeve 100. The removable lid 112 has handles 116 for use by the user to lift the removable lid 112 from the top opening of the sleeve 100. The removable lid allows the user to monitor the status of the material being heated, add more material as needed and perform operations to aid in the melting process such as add flux or remove slag. The removable lid also allows the user to view the holder during lifting of the sleeve. The base 114 provides a surface upon which the sleeve 100 rests.

The outer surface of the sleeve 100 has handles 118 disposed thereon or integral therewith that permit the sleeve to be vertically lifted and removed from or placed on the base 114. As described above, the sleeve 100 is not physically attached to the base 114. A crucible 120 is positioned on the base 114 and holds the metallic material to be heated or melted.

Figure 1B:
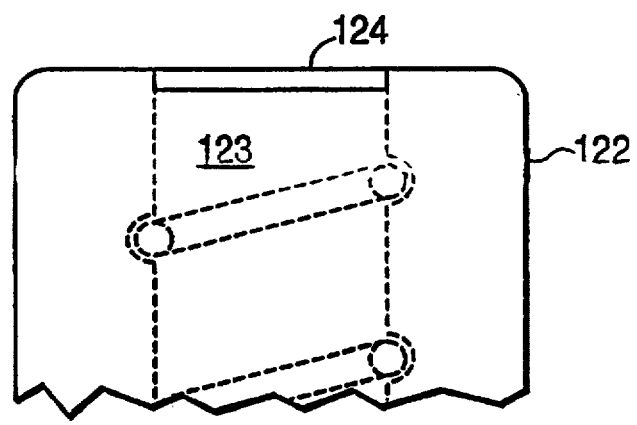
FIG. 1B illustrates another embodiment of the sleeve of the electric furnace of the present invention.
Figure 2A:
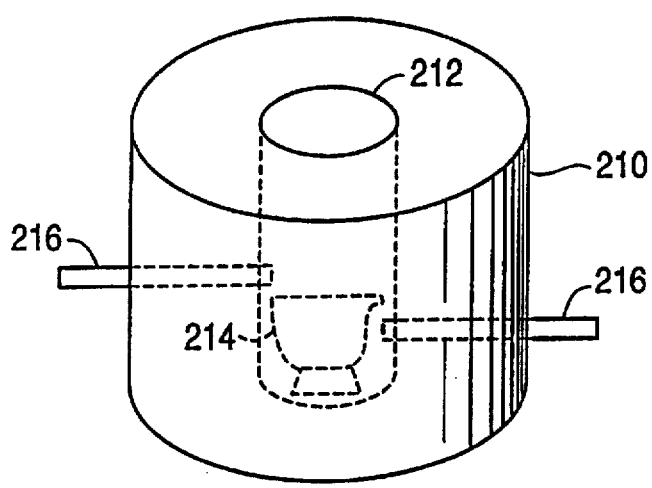
FIGS. 2A–D illustrate a conventional fuel fired furnace and conventional casting apparatus.
Figure 2B:
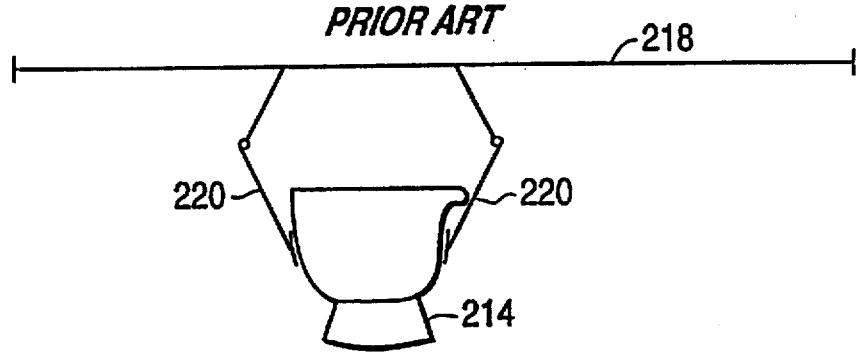
Figure 2C:
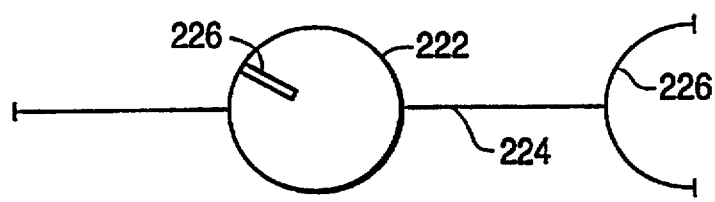
Figure 2D:

Another embodiment of the sleeve is illustrated in FIG. 1B. The sleeve of the other embodiment is formed as a heating unit 122 as illustrated in FIG. 1B. The heating unit 122 is formed in the same manner as the sleeve described above, with respect to FIG. 1A, except that the heating unit 122 eliminates the need for the removable lid 112. The heating unit 122 as illustrated in FIG. 1B has an open bottom and a closed top and a chamber 123 formed within the heating unit that communicates with the open bottom. A window 124 is provided at the closed top to permit the user to monitor the status of the material being heated.

Figure 3:
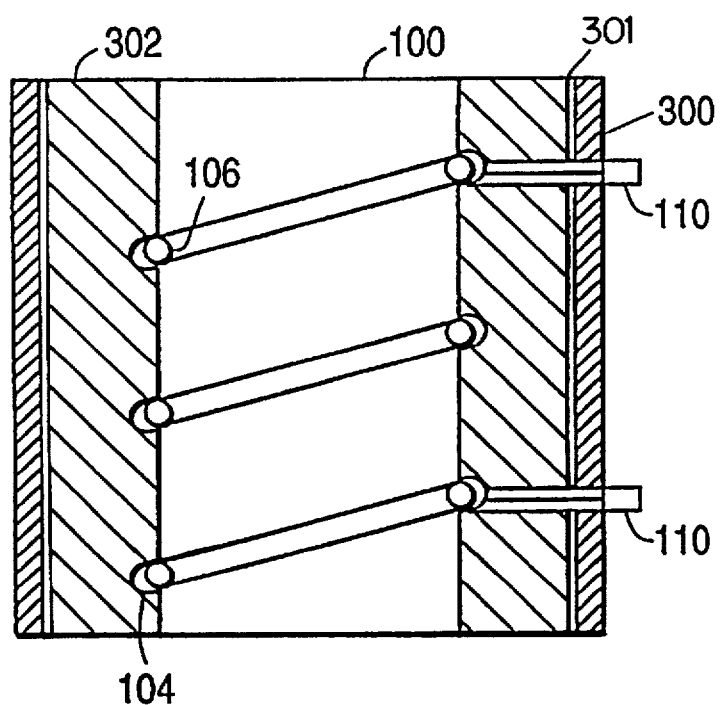
FIG. 3 illustrates a sectioned view of the sleeve of the present invention.

FIG. 3 illustrates a section view of the sleeve 100. The sleeve 100, as illustrated in FIG. 3 has an outer layer 300 made of a metallic material and an inner layer 302 made of a refractory or ceramic type material which can withstand high temperatures. Insulative material or an air space 301 may be provided between the outer layer 300 and the inner layer 302 so as to insulate the outer layer 300 from the high temperatures generated within the sleeve. Providing an insulative material or an air space between the outer layer 300 and the inner layer 302 causes the outer layer 300 to remain at relatively low temperatures permitting the user to contact the outer surface of the sleeve 100 even when the furnace is being operated.

Grooves 104 are formed in the inner surface of the sleeve 100. The grooves may be formed by machining or by molding refractory or ceramic material about a rubber hose helically wound over a mandril. The rubber hose is either removed or is burned off during the hardening process thereby leaving a groove in the inner surface of the sleeve 100. The refractory or ceramic material may also be molded about the electric heating element 106.

Figure 4:
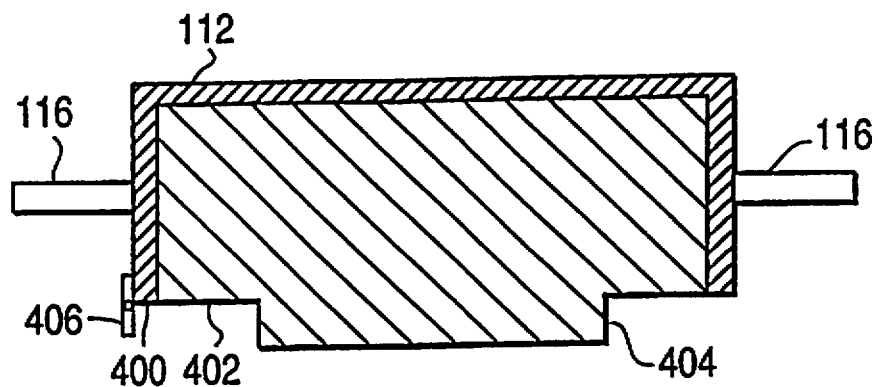
FIG. 4 illustrates a removable lid of the present invention.

FIG. 4 illustrates a section view of the removable lid 112. The removable lid 112, like the sleeve 100 illustrated in FIG. 3, includes an outer layer 400 made of a metallic material and an inner layer 402 formed of a refractory or ceramic type material which can withstand high temperatures. Also the removable lid 112 includes handles 116. The removable lid 112, as illustrated in FIG. 4, includes a stopper portion 404 which causes the removable lid 112 to snugly fit within the top opening of the sleeve 100. The removable lid 112 may also be pivotally attached to the top surface of the sleeve 100 by a hinge 406. One end of the hinge 406 being attached to the removable lid 112 as illustrated in FIG. 4 and the other end of the hinge 406 being attached to an uppermost part of the outer surface of the sleeve 100 near the top opening of the sleeve 100.

Insulative material or an air space may be provided between the outer layer 400 and the inner layer 402 of the removable lid 112 to insulate the outer layer 400 from the high temperatures generated within the furnace. Thus, the outer surface of the removable lid 112 may be touched by the user even during operation of the furnace.

Figure 5:
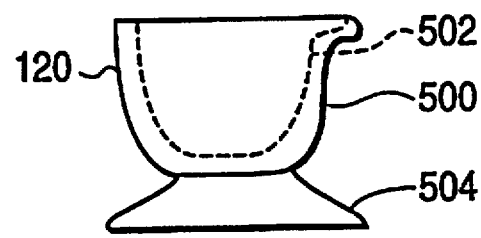
FIG. 5 illustrates crucible of the present invention.

FIG. 5 illustrates the crucible 120 of the present invention. The crucible includes a cup 500 for holding the material to be melted and a spout 502 used for pouring the melted material. The crucible 120 also includes a crucible base 504 having a relatively large foot for stability.

Figure 6:
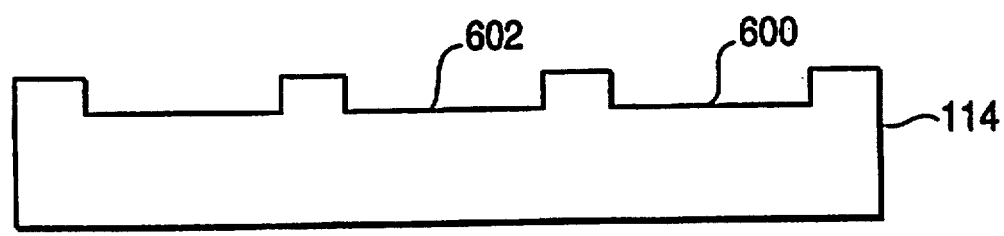
FIG. 6 illustrates a base of the present invention.

FIG. 6 illustrates the base 114 of the present invention. The base 114 is made of fire resistant brick or other material. The base includes a concentric groove 600 formed in the top surface of the base 114 for receiving the sleeve 100. The base 114 also includes a center landing area 602 for receiving the crucible base 504.

When the sleeve 100 is placed in the concentric groove 600 of the base 114 and the stopper portion 404 of the removable lid 112 is fitted snugly into the top opening of the sleeve 100, a heating chamber is formed by the top surface of the base 114, the inner surface 102 of the sleeve 100 and the stopper portion 404 of the removable lid 112. When an electric current is applied to the electric heating element 106, heat is generated by the electric heating element 106 and retained in the heating chamber. The heat retained in the heating chamber heats and ultimately melts the material held by the crucible 120 which has been positioned on the landing area 602 of the base 114.

In order to heat or melt metallic material in the electric furnace of the present invention the following steps, as illustrated in FIG. 7 are performed:

Step 701: The sleeve 100 is vertically lifted by handles 118 away from the base 114 and placed on the floor beside the base.

Step 702: Metallic material to be melted is placed on the crucible 120 and the crucible is positioned on the base 114.

Step 703: The sleeve is vertically lifted by handles 118 and placed on the base 114 enclosing the crucible 120.

Step 704: The removable lid 112 is placed on the top opening of the sleeve 100.

Step 705: Electric power is applied to the connectors 110 to cause an electric current to flow through the electric heating element 106 thereby generating heat.

Step 706: The state of the metallic material contained in the crucible 120 is monitored by vertically lifting the removable lid 112 from the top opening of the sleeve 100 using the handles 116. Flux may be added to or slag may be removed from the material contained in the crucible through the top opening of the sleeve 100 when the lid is removed.

Step 707: Once the metallic material has completely melted the sleeve is vertically lifted and removed from the base using handles 118 and placed on the floor beside the base 114.

Step 708: Tongs are used to grab the crucible 120 and pour the melted material into the mold.

There has been described a new and useful electric furnace having apparatus for reducing unnecessary handling of the melted material. It should be appreciated that modifications and additions will be apparent to those of ordinary skill in the art in applying the teachings of the invention described herein to various applications. Accordingly, the invention should not be limited by the description herein of the preferred embodiments but rather the invention should be construed in accordance with the following claims.

I claim:

1. A method of heating a material being held by a holder positioned on a base using an electric furnace which includes a sleeve for enclosing the holder positioned on the base, an electric heating element disposed on the inner surface of said sleeve, a removable lid for covering a top opening of said sleeve, and at least one handle disposed on the outer surface of said sleeve, said method comprising the steps of:

placing said sleeve including said removable lid, using said at least one handle, on the base enclosing the holder;

applying an electric current to said electric heating element, thereby generating heat which is retained in said electric furnace to heat the material held in the holder; and removing said sleeve including said removable lid from said base by lifting said sleeve using said at least one handle after the material held in the holder has been heated.

2. A method according to claim 1 wherein said sleeve includes an outer layer and an inner layer.

3. A method according to claim 2 wherein said outer layer is made of a metallic material and said inner layer is made of a refractory material.

4. A method according to claim 2 wherein said outer layer is made of a metallic material and said inner layer is made of a ceramic material.

5. A method according to claim 2 wherein an insulative material is provided between said outer layer and said inner layer.

6. A method according to claim 2 wherein an air space is provided between said outer layer and said inner layer.

7. A method according to claim 1 wherein said removable lid is pivotally attached to an uppermost part of the outer surface of said sleeve.

8. A method according to claim 1 wherein a helical groove is formed in the inner surface of said sleeve and said electric heating element is disposed in said helical groove.

9. A method according to claim 1 wherein said removable lid comprises an outer layer and an inner layer.

10. A method according to claim 9 wherein said outer layer is formed of a metallic material and said inner layer is formed of a refractory material.

11. A method according to claim 9 wherein said outer layer is formed of a metallic material and said inner layer is formed of a refractory material.

12. A method according to claim 1 wherein said at least one handle is formed integrally with the outer surface of said sleeve.

13. A method according to claim 1 wherein said heat generated by said electric heating element is sufficient to melt the material held in the holder.

14. A method of heating a material held by a holder positioned on a base using an electric furnace which includes a heating unit having an open end and a closed end wherein the open end communicates with a chamber formed within said heating unit, an electric heating element disposed on the surface of said chamber formed within said heating unit, and at least one handle disposed on the outer surface of said heating unit, said method comprising the steps of:

placing said heating unit, using said at least one handle, on the base enclosing the holder within said chamber;

applying an electric current to said heating element, thereby generating heat which is retained in said chamber to heat the material held by the holder; and removing said heating unit from said base by lifting said heating unit using said at least one handle after the material held in the holder has been heated, wherein said closed end of said heating unit includes a window which permits a user to monitor conditions of said material.

15. A method according to claim 14 wherein said heating unit includes an outer layer and an inner layer.

16. A method according to claim 15 wherein said outer layer is formed of a metallic material and said inner layer is formed of a refractory material.

17. A method according to claim 15, wherein said outer layer is formed of a metallic material and said inner layer is formed of a ceramic material.

18. A method according to claim 14 wherein said at least one handle is formed integrally with the outer surface of said heating unit.

19. A method according to claim 14 wherein said heat generated by said electric heating element is sufficient to melt the material held by the holder.

20. A method according to claim 14, wherein said chamber is closable.

* * * * *